April 11, 1939.  G. F. THOMAS ET AL  2,154,116
LUBRICANT RECEIVING FITTING
Filed July 8, 1936
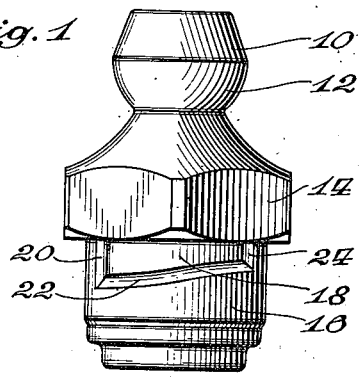
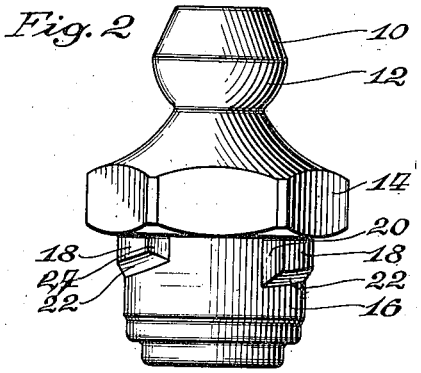
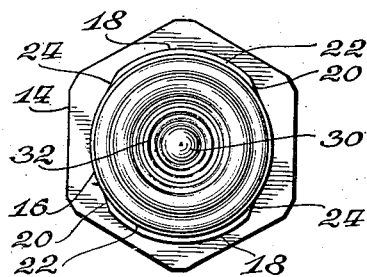
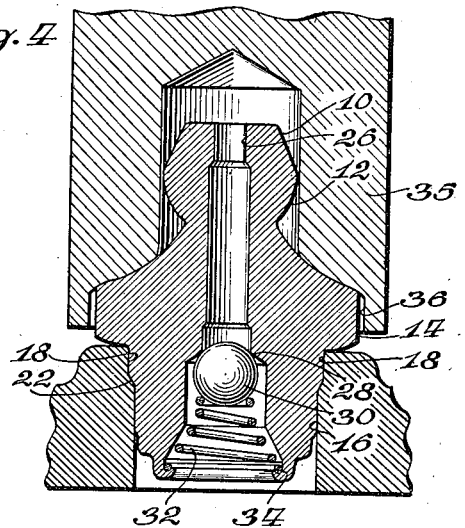
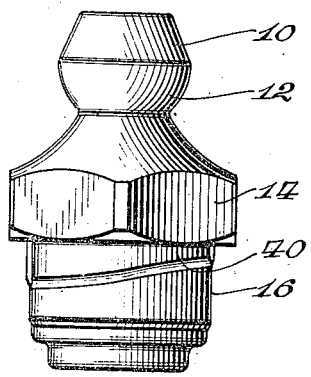
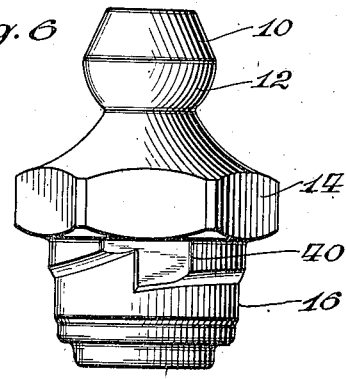
Inventors:
George F. Thomas
Frank A. Ross
Joseph Bystricky
By Williams, Bradbury, McCaleb & Hinkle
Attys.

Patented Apr. 11, 1939

2,154,116

UNITED STATES PATENT OFFICE

2,154,116

LUBRICANT RECEIVING FITTING

George F. Thomas, Riverside, Frank A. Ross, Lake Bluff, and Joseph Bystricky, Chicago, Ill., assignors to Stewart-Warner Corporation, Chicago, Ill., a corporation of Virginia Application July 8, 1936, Serial No. 89,504

1 Claim. (Cl. 285—25)

Our invention relates generally to lubricant receiving fittings, and more particularly to fittings usable in high pressure lubricating systems. Our invention relates specifically to a fitting of this type which may be driven or pressed into the oil hole of a bearing, without making it necessary to tap the oil hole.

A number of so-called drive type lubricant receiving fittings which may be driven into the oil hole of a bearing instead of being screwed therein have been proposed in the past, but in most of these of which we are aware special tools are required to remove the fitting. The fitting of our invention, after being driven securely into the oil hole of a bearing, may be removed therefrom merely by rotating the fitting by means of a wrench. After a fitting has been removed, a new fitting may be replaced in the bearing from which the fitting was removed, without further preparation of the oil hole of the bearing.

It is thus an object of our invention to provide an improved drive type lubricant receiving fitting which may be pressed or driven into the untapped oil hole of a bearing, and may be removed therefrom by an unscrewing operation.

A further object of our invention is to provide an improved drive type lubricant receiving fitting which may be easily driven into place, which will be lubricant-tight under high pressure, and which may be easily removed.

Other objects will appear from the following description, reference being had to the accompanying drawing, in which:

Figure 1 is a front elevation of a fitting;
Figure 2 is a side elevation thereof;
Figure 3 is a bottom plan view;
Figure 4 is a central vertical sectional view of the fitting shown in place in an oil hole of a bearing;
Figure 5 is a front elevation of a modified form of our invention; and
Figure 6 is a side elevation of the modification shown in Figure 5.

As best shown in Figures 1 and 4, the fitting of our invention comprises a head 10 which is conformed to receive the nozzle or coupler of a high pressure lubricant compressor. Fittings having heads of this type and couplers therefor are more fully disclosed in the patent to Thomas and Bystricky, No. 2,016,809, granted October 8, 1935.

The head 10 is formed integrally with a neck portion 12, a hexagonal wrench engaging portion 14, and a shank portion 16. The shank is provided with a pair of lugs 18 which are raised from the cylindrical surface of the shank and the edges of which are joined to the shank 16 by beveled surfaces 20, 22 and 24. The surfaces 20 and 24 extend substantially vertically while the surface 22 is helical. As best shown in Figure 3, the lugs are disposed diametrically opposite to each other. The higher surfaces of the lugs 18 extend through approximately 90° of the circumference of the shank 16, while the lugs, including the beveled surfaces 20 and 24, extend through an angle of approximately 120°. The angle of taper of the beveled surface 22 with respect to the axis of the fitting may be in the order of 10° to 20°. This angle may be varied and the distance the lug projects from the shank increased or decreased, depending upon the hardness and toughness of the material into which the fitting is to be driven. However, for ordinary purposes an angle of taper as given above and a thickness of approximately .010" to .015" will prove satisfactory. With a fitting of these dimensions, a tolerance of plus or minus .003" may be allowed in the diameter of the hole in the bearing into which the fitting is to be driven.

As shown in Figure 4, the fitting is provided with an inlet passageway 26 of successively increasing diameter, the step between successive increases in diameter forming a valve seat 28 for a ball check valve 30 pressed thereagainst by a spring 32. The lower end of the spring rests upon a seat 34 which may be a flange turned inwardly at the bottom of the fitting.

In normal use, the fitting may be forced into the bearing by a suitable tool 35 shown in Figure 4 which may be struck with a hammer or be forced downwardly by a press. The lugs 18 will, during the time that the fitting is being pressed into the oil hole of the bearing, deform the metal of the bearing by a drawing or swaging action rather than by cutting, particularly due to the beveled surface 22.

When it is desired to remove the fitting, the tool 35, which may be provided with a suitable hexagon-shaped socket portion 36, may be used to rotate the fitting counterclockwise, or any ordinary socket or other wrench may be employed for this purpose. Upon rotating the fitting counterclockwise, the beveled helical surfaces 22 will act as screw threads against the compacted metal of the bearing, and the fitting will be forced from the oil hole by turning it through an angle of approximately 180° counterclockwise.

When the fitting is to be used under adverse conditions, such, for example, as when the tolerance allowed in the diameter of the oil hole into which it is to be driven is relatively great, it may be desirable to form the lugs in the manner shown in Figures 5 and 6, to insure that the connection between the fitting and the bearing will be lubricant-tight. In this latter construction, the lugs 40 may extend through an angle of 180° of the circumference of the shank and may merge a short distance beneath the lower edge of the hexagon-shaped portion of the fitting so that a continuous shoulder will be present directly beneath the hexagon portion in addition to the lugs. When this fitting is driven into the oil hole of a bearing, the lugs 40 will deform the metal of the bearing around the oil hole in the manner previously described, and since the shank, immediately beneath the hexagon-shaped portion, is of increased diameter, the metal around the upper edge of the oil hole will be deformed to receive this enlarged portion of the shank, and will be tightly pressed thereagainst, to form a lubricant-tight seal. This fitting may be removed from the oil hole merely by turning it counterclockwise in the same manner as the fitting shown in Figures 1 to 4 inclusive may be removed.

In both forms of fitting disclosed herein it is desirable that the wall of the shank be maintained as thick and heavy as possible so that the shank will have maximum strength against the radially inwardly directed forces engendered during the driving operation which would otherwise tend to collapse the shank.

While we have shown and described a preferred embodiment of our invention, it will be readily understood by those skilled in the art that variations may be made in the construction disclosed without departing from the basic features of our invention. We therefore do not wish to be limited to the precise construction disclosed, but wish to include within the scope of our invention all such modifications and variations which will readily suggest themselves.

What we claim as new and desire to secure by Letters Patent of the United States is:

A drive type lubricant receiving fitting for high pressure lubricating systems, comprising a part for making detachable connections with a source of lubricant under pressure, and a shank portion formed integrally with said first named part, said shank portion having a cylindrical pilot part of substantially the diameter of the bearing oil hole into which the fitting is to be driven, and said shank portion having a projecting lug having cylindrical surfaces concentric with the surface of said shank portion and having its downwardly facing edge beveled and extending around the shank in helical form, whereby the fitting may be driven into the oil hole of a bearing and later removed therefrom by rotating the fitting, the said helical surface of the lug reacting against the metal of the bearing in the manner of a screw.

GEORGE F. THOMAS.
FRANK A. ROSS.
JOSEPH BYSTRICKY.